(12) United States Patent
Leskinen et al.

(10) Patent No.: US 12,134,688 B2
(45) Date of Patent: Nov. 5, 2024

(54) POLYPROPYLENE PIPE COMPOSITION

(71) Applicant: BOREALIS AG, Vienna (AT)

(72) Inventors: Pauli Leskinen, Porvoo (FI); Jingbo Wang, Linz (AT); Markus Gahleitner, Linz (AT); Klaus Bernreitner, Linz (AT)

(73) Assignee: BOREALIS AG, Vienna (AT)

( * ) Notice: Subject to any disclaimer, the term of this patent is extended or adjusted under 35 U.S.C. 154(b) by 745 days.

(21) Appl. No.: 17/050,048

(22) PCT Filed: May 7, 2019

(86) PCT No.: PCT/EP2019/061601
§ 371 (c)(1),
(2) Date: Oct. 23, 2020

(87) PCT Pub. No.: WO2019/215108
PCT Pub. Date: Nov. 14, 2019

(65) Prior Publication Data
US 2021/0108058 A1  Apr. 15, 2021

(30) Foreign Application Priority Data
May 9, 2018 (EP) .................................. 18171564

(51) Int. Cl.
| | | |
|---|---|---|
| C08L 23/14 | (2006.01) | |
| B01J 8/24 | (2006.01) | |
| B01J 19/18 | (2006.01) | |
| C08F 2/01 | (2006.01) | |
| C08F 2/34 | (2006.01) | |
| C08F 4/6592 | (2006.01) | |
| C08L 23/20 | (2006.01) | |

(52) U.S. Cl.
CPC ............... C08L 23/14 (2013.01); B01J 8/24 (2013.01); B01J 19/1837 (2013.01); C08F 2/01 (2013.01); C08F 2/34 (2013.01); C08F 4/65927 (2013.01); C08L 23/20 (2013.01); C08L 2203/18 (2013.01)

(58) Field of Classification Search
CPC .. C08F 210/06; C08F 210/14; C08F 2500/12; C08F 2500/34
See application file for complete search history.

(56) References Cited

U.S. PATENT DOCUMENTS

| | | |
|---|---|---|
| 3,242,150 A | 3/1966 | Scoggin |
| 3,324,093 A | 6/1967 | Alleman |
| 3,374,211 A | 3/1968 | Marwil et al. |
| 3,405,109 A | 10/1968 | Rohlfing |
| 4,582,816 A * | 4/1986 | Miro ............. C08F 10/00 526/125.8 |
| 5,391,654 A | 2/1995 | Ahvenainen et al. |
| 6,521,709 B2 | 2/2003 | Pitteri et al. |
| 9,783,662 B2 | 10/2017 | Wang et al. |
| 2011/0104416 A1 | 5/2011 | Bernreitner et al. |
| 2011/0315264 A1* | 12/2011 | Bernreitner ............ F16L 9/12 526/159 |
| 2013/0203931 A1* | 8/2013 | Paavilainen ....... C09D 123/142 525/240 |
| 2014/0079899 A1* | 3/2014 | Bernreitner ............ F16L 9/127 428/36.9 |

FOREIGN PATENT DOCUMENTS

| | | |
|---|---|---|
| CN | 1240201 A | 1/2000 |
| CN | 101006351 A | 7/2007 |
| CN | 101861339 | 10/2010 |
| CN | 101889030 A | 11/2010 |
| CN | 102105499 A | 6/2011 |
| CN | 102858869 A | 1/2013 |
| CN | 103282425 A | 9/2013 |
| CN | 103298874 A | 9/2013 |
| CN | 103298875 A | 9/2013 |
| CN | 105377915 A | 3/2016 |
| CN | 107001526 A1 | 8/2017 |
| CN | 107603031 A1 | 1/2018 |
| EP | 0260974 B1 | 5/1989 |
| EP | 0428054 A1 | 5/1991 |
| EP | 0479186 A2 | 4/1992 |
| EP | 0491566 A2 | 6/1992 |
| EP | 0887379 A1 | 12/1998 |

(Continued)

OTHER PUBLICATIONS

Applicant: Borealis AG; "Polypropylene Pipe Composition"; Korean Patent Application No. 10-2020-7028883; Korean Office Action dated Nov. 4, 2021; 14 pgs.
Applicant: Borealis AG; Polypropylene Pipe Composition; Chinese Patent Application No. 201980027460.4; Chinese Office Action dated Sep. 5, 2022; 20 pgs.
Applicant: Borealis AG; European Patent Application No. 18171564. 0; Extended European Search Report dated Nov. 22, 2018; 6 pgs.
Busico, V., et al.; "Alk-1-ene Polymerization in the Presence of a Monocyclopentadienyl Zirconium(IV) Acetamidinate Catalyst: Microstructural and Mechanistic Insights"; Macromolecular Rapid Communications; vol. 28, Issue 10; May 16, 2007; https://doi.org/10.1002/marc.200700098; 7 pgs.
H. N. Cheng; "Carbon-13 NMR analysis of ethylene-propylene rubbers"; Macromolecules May 31, 1983 17 (10), DOI: 10.1021/ma00140a012; 6 PGS.

(Continued)

*Primary Examiner* — Mark S Kaucher
(74) *Attorney, Agent, or Firm* — Tarolli, Sundheim, Covell & Tummino LLP

(57) ABSTRACT

Polypropylene composition having a melting temperature Tm of 135° C. to 140° C. (DSC according to ISO 11357/part 3), —an $MFR_2$ of 0.05 to 0.50 g/10 min (2.16 kg, 230° C., ISO1133), a XS according to ISO16152 of 0.2 to 2.5 wt.-%, and a molecular weight distribution Mw/Mn of at least 2.8 and less than 6.0, wherein Mn is the number average molecular weight and Mw is the weight average molecular weight both being determined by Gel Permeation Chromatography (GPC) according to ISO 16014-4:2003, and ASTM D 6474-99, whereby the polypropylene composition comprises units derived from 1-hexene in an amount of 1.80 wt.-% to 5.0 wt.-%.

2 Claims, No Drawings

(56) References Cited

FOREIGN PATENT DOCUMENTS

| | | |
|---|---|---|
| EP | 0887380 A1 | 12/1998 |
| EP | 0887381 A1 | 12/1998 |
| EP | 0891990 A2 | 1/1999 |
| EP | 1310295 A1 | 5/2003 |
| EP | 1415999 A1 | 5/2004 |
| EP | 1591460 A1 | 11/2005 |
| EP | 1600276 A1 | 11/2005 |
| EP | 1860125 A1 | 11/2007 |
| EP | 2386603 A1 | 11/2011 |
| EP | 2787034 A1 | 10/2014 |
| GB | 1580635 A | 12/1980 |
| IN | 103608174 A | 2/2014 |
| JP | H10338775 A | 12/1998 |
| JP | 2001504895 A | 4/2001 |
| JP | 2002080653 A | 3/2002 |
| KR | 20110017406 A | 2/2011 |
| KR | 20110073585 A | 6/2011 |
| KR | 20140045513 A | 4/2014 |
| WO | 1992/19653 A1 | 11/1992 |
| WO | 1992/19658 A1 | 11/1992 |
| WO | 94/14856 A1 | 7/1994 |
| WO | 95/12622 A1 | 5/1995 |
| WO | 98/15591 A1 | 4/1998 |
| WO | 98/58976 A1 | 12/1998 |
| WO | 98/58977 A1 | 12/1998 |
| WO | 1998/58977 A1 | 12/1998 |
| WO | 2000/66640 A1 | 11/2000 |
| WO | 2002/02576 A1 | 1/2002 |
| WO | 2003/051934 | 6/2003 |
| WO | 2003/086724 A1 | 10/2003 |
| WO | 2006/063771 A1 | 6/2006 |
| WO | 2006/097497 A1 | 9/2006 |
| WO | 2007/116034 A1 | 10/2007 |
| WO | 2009144166 A1 | 12/2009 |
| WO | 2011/042361 A1 | 4/2011 |
| WO | 2011/076780 A1 | 6/2011 |
| WO | 2011131639 A1 | 10/2011 |
| WO | 2011135004 | 11/2011 |
| WO | 2012001052 | 1/2012 |
| WO | 2012084961 A1 | 6/2012 |
| WO | 2013007650 A1 | 1/2013 |
| WO | 2015/011135 A1 | 1/2015 |
| WO | 2015/014632 A1 | 2/2015 |
| WO | 2015158790 | 10/2015 |

OTHER PUBLICATIONS

John M. Griffin, et al.; "Low-load rotor-synchronised Hahn-echo pulse train (RS-HEPT) 1H decoupling in solid-state NMR: factors affecting MAS spin-echo dephasing times"; Magnetic Resonance in Chemictry; Magn. Reson. Chem. 2007; 45: S198-S208; Published online in Wiley InterScience (www.interscience.wiley.com) DOI: 10.1002/mrc.2145; Oct. 16, 2007; 11 pgs.

Katja Klimke, et al.; "Optimisation and Application of Polyolefin Branch Quantification by Melt-State 13C NMR Spectroscopy"; Macromolecular Chemistry and Physics; DOI: 10.1002/macp. 200500422; Dec. 1, 2005; 14 pgs.

Luigi Resconi, et al.; "Selectivity in Propene Polymerization with Metallocene Catalysts"; Chem. Rev. 2000, 100, Sep. 16, 1999; 94 pgs.

M. Pollard; et al.,; "Observation of Chain Branching in Polyethylene in the Solid State and Melt via 13C NMR Spectroscopy and Melt NMR Relaxation Time Measurements"; Macromolecules 2004, 37, Sep. 17, 2003; 13 pgs.

Matthew Parkinson, et al.; "Effect of Branch Length on 13C NMR Relaxation Properties in Molten Poly[ethyleneco-(a-olefin)] Model Systems"; Macromolecular Chemistry and Physics; InterScience; vol. 208, Issue19-20; DOI: 10.1002/macp.200700209; Oct. 24, 2007; 6 pgs.

Patrice Castignolles, et al.; "Detection and quantification of branching in polyacrylates by size-exclusion chromatography (SEC) and melt-state 13C NMR spectroscopy"; Polymer 50; journal homepage: www.elsevier.com/locate/polymer, Mar. 24, 2009; 11 pgs.

Wen-Jun Wang and Shiping Zhu; "Structural Analysis of Ethylene/ Propylene Copolymers Synthesized with a Constrained Geometry Catalyst"; Macromolecules 2000, 33; Dec. 9, 1999; 6 pgs.

Xenia Filip, et al.; "Heteronuclear decoupling under fast MAS by a rotor-synchronized Hahn-echo pulse train"; Communication; Journal of Magnetic Resonance; Elsevier; Jul. 21, 2005; 5 pgs.

Chinese Application No. 201980027536.3, Decision to Grant dated Nov. 8, 2023.

Masahiro Kakugo, et al.; "C NMR Determination of Monomer Sequence Distribution in Ethylene-Propylene Copolymers Prepared with 6-TiCl3-Al(C2H5%)Cl"; Macromolecules, Publication Date:Jul. 1, 1982; (https://doi.org/10.1021/ma00232a037); pp. 1150-1152.

T.M. Ushakova, et al.; "Influence of copolymer fraction composition in ultrahigh molecular weight polyethylene blends with ethylene/ 1-hexene copolymers on material physical and tensile properties"; Journal of Applied Polymer Science 131, 40151, Nov. 2, 2013; (doi: 10.1002/app.40151); 8 pgs.

Zhe Zhou, et al.; "A new decoupling method for accurate quantification of polyethylene copolymer composition and triad sequence distribution with C NMR"; ScienceDirect www.sciencedirect.com Journal of Magnetic Resonance 187 May 23, 2007; pp. 225-233.

Gurmeet Singh, Ajay V. Kothari, Virendra K. Gupta; "Triad Sequence Determination of Ethylene-Propylene Copolymers—Application of Quantitative C NMR"; ScienceDirect Polymer Testing; www.elsevier. com/locate/polytest; Feb. 27, 2009; 5 pp.

European Application No. 18171575.6, European Search Report dated Nov. 26, 2018.

Korean Application No. 10-2020-7033572, Decision to Granted Jul. 28, 2022.

UAE Application No. P6001459/2020, Office Action dated Dec. 18, 2023.

Chinese Application No. 201980027460.4, Office Action dated Jul. 1, 2024.

\* cited by examiner

POLYPROPYLENE PIPE COMPOSITION

FIELD OF THE INVENTION

The present invention relates to a polyproyplene composition suitable for pipe applications and pipes made therefrom. The present invention further relates to a two-step polymerization process using metallocene catalysts for producing said polyproyplene composition.

BACKGROUND OF THE INVENTION

For providing polyolefin compositions applicable for pipe applications it is necessary that the catalyst enables the production of relatively high molecular weight, as otherwise the required mechanical properties cannot be met. This is quite a general problem for single-site catalyst (SSC). In order to produce pipe grades, melt flow rates (2.16 kg) of below about 0.50 g/10 min should be reached. The majority of single-site catalysts suitable for polypropylene do not allow reaching such low melt flow rates. In this context it should be kept in mind that the use of higher α-olefins such as 1-hexene as co-monomer typically increases melt flow rate, which makes the target even more challenging. A further practical limitation concerns the sensitivity of the single-site catalysts to hydrogen used as molecular weight control agent, meaning that small differences in hydrogen amount may cause fluctuation in the propylene polymerization.

EP 2386603 concerns propylene copolymer compositions (P) comprising (a) a polypropylene (A) having a comonomer content of not more than 1.0 wt.-%, with comonomers being C5 to C12 α-olefins, and (b) a propylene copolymer (B) having a comonomer content 4.0 to 20.0 wt.-% with comonomers being C5 to C12 α-olefins. The compositions have undesirable high melt flow rates (MFR2), effectively preventing the application for pipes.

WO2015014632 concerns a process for the preparation of a copolymer of propylene and a C4-12 α-olefin (PPC), said copolymer (PPC) having a melt flow rate MFR2 (230° C.) measured according to ISO 1133 of below 3.0 g/10 min, wherein propylene and C4-12 α-olefin are polymerized in the presence of a single site catalyst. WO2015014632 aims at relatively high XS of 0.5 to 16.0 wt.-% and a rather low melting temperature. The polymers are further unimodal, resulting from a single polymerisation step being also reflected by a low Mw/Mn of around 2.2 corresponding with limited processability.

Thus, there was still the need for a polypropylene pipe material and also a pipe made therefrom with sufficiently high melting point, relatively low melt flow rate and relatively high comonomer content as well as typical single site derived comonomer distribution characteristics and simultaneously good processability.

The present invention is based on the finding that a specific single site catalyst system together with a sequential process allows sufficiently low melt flow rate as desirable for pipe applications and simultaneously has outstanding comonomer response enabling high comonomer incorporation rates. The present invention is further based on the surprising finding that pipes made from the inventive compositions have excellent pressure test stabilities.

SUMMARY OF THE INVENTION

The present invention insofar provides
a polypropylene composition having
a melting temperature Tm of 135° C. to 140° C. (DSC according to ISO 11357/part 3),
an MFR2 of 0.05 to 0.50 g/10 min (2.16 kg, 230° C., ISO1133),
a XS according to ISO16152 of 0.2 to 0.5 wt.-%, and
a molecular weight distribution Mw/Mn of at least 2.8 and less than 6.0, wherein Mn is the number average molecular weight and Mw is the weight average molecular weight both being determined by Gel Permeation Chromatography (GPC) according to ISO 16014-4:2003 and ASTM D 6474-99, whereby the polyproyplene composition comprises units derived from 1-hexene in an amount of 1.80 wt.-% to 5.0 wt.-%.

The present invention further provides an article, preferably a pipe comprising the inventive polypropylene composition.

In a further aspect the present invention provides a process for obtaining the inventive polypropylene composition, the process comprising the steps of
(a) introducing a stream of propylene and 1-hexene to a first reactor, so that the ratio of the feed rate of 1-hexene to the feed rate of propylene is from 2.0 to 4.0 mol/kmol; further introducing a stream of catalyst system to the first reactor, whereby the catalyst has the following structure

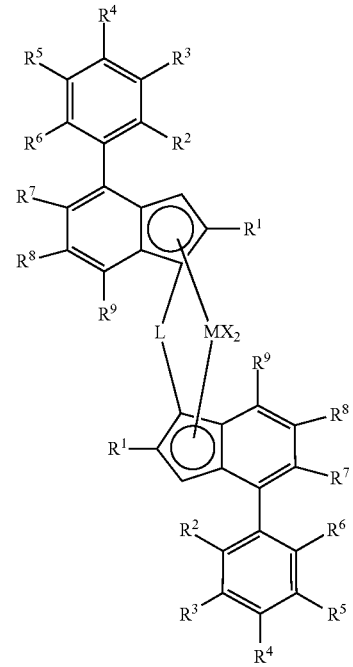

wherein
M is zirconium or hafnium;
each X independently is a sigma-donor ligand
L is a bridge of formula -(ER$^{10}_2$)$_y$—;
y is 1 or 2;
E is C or Si;
each R$^{10}$ is independently a C$_1$-C$_{20}$-hydrocarbyl group, tri(C$_1$-C$_{20}$ alkyl)silyl group, C$_6$-C$_{20}$ aryl group, C$_7$-C$_{20}$ arylalkyl group or $C_7$-$C_{20}$ alkylaryl group or L is an alkylene group such as methylene or ethylene;

$R^1$ are each independently the same or are different from each other and are a $CH_2$—$R^{11}$ group, with $R^{11}$ being H or linear or branched $C_1$-$C_6$ alkyl group, $C_3$-$C_8$ cycloalkyl group, $C_6$-$C_{10}$ aryl group;

$R^3$, $R^4$ and $R^5$ are each independently the same or different from each other and are H or a linear or branched $C_1$-$C_6$ alkyl group, $C_7$-$C_{20}$ arylalkyl group, $C_7$-$C_{20}$ alkylaryl group, or $C_6$-$C_{20}$ aryl group with the proviso that if there are four or more $R^3$, $R^4$ and $R^5$ groups different from H present in total, one or more of $R^3$, $R^4$ and $R^5$ is other than tert butyl;

$R^7$ and $R^8$ are each independently the same or different from each other and are H, a $CH_2$—$R^{12}$ group, with $R^{12}$ being H or linear or branched $C_1$-$C_6$ alkyl group, $SiR^{13}_3$, $GeR^{13}_3$, $OR^{13}$, $SR^{13}$, $NR^{13}_2$, wherein $R^{13}$ is a linear or branched $C_1$-$C_6$ alkyl group, $C_7$-$C_{20}$ alkylaryl group and $C_7$-$C_{20}$ arylalkyl group or $C_6$-$C_{20}$ aryl group, $R^9$ are each independently the same or different from each other and are H or a linear or branched $C_1$-$C_6$ alkyl group; and $R^2$ and $R^6$ all are H;

in the presence of cocatalyst system comprising a boron containing cocatalyst and an aluminoxane cocatalyst thereby polymerizing propylene and 1-hexene in the presence of the catalyst system in the first reactor to produce a first intermediate (PP1);

(b) withdrawing a product stream comprising the first intermediate (PP1) from the first reactor (c) transferring the first intermediate (PP1) to a second reactor and further polymerizing in the second reactor the first intermediate by feeding further propylene, 1-hexene, and optionally ethylene further in the presence of hydrogen such that the ratio of the concentration of hydrogen to the concentration of propylene is in the range of 0.1 to 0.8 mol/kmol; and further the concentration of 1-hexene to the concentration of propylene is in the range of 3.0 to 6.0 mol/kmol whereby yielding a raw polypropylene composition (PP2), (d) extruding said raw polypropylene composition (PP2) to yield the polypropylene composition.

In yet a further aspect the present invention pertains to a polypropylene composition as described herein and obtained by the inventive process. The polypropylene composition according to the present invention is of extreme value for articles, particularly pipe and pipe related applications. Particularly the polyproplyene composition according to the present invention has very good processability, excellent comonomer distribution and enables articles, particularly pipe having very good stiffness. On top of that, the inventive compositions provide excellent notched impact strength over a broad range of temperatures from −20° C. up to +23° C. Such impact strength is further obtained at a relatively high stiffness, meaning the stiffness-impact tradeoff is at least partially overcome.

The pipes made from the inventive polypropylene composition further have excellent pressure test properties both at room temperature as well as at high temperature tests at 95° C.

In addition to that, the process according to the present invention allows excellent polypropylene powder quality as reflected by low fines and very low total volatiles indicating better homogeneity. This allows to skip or minimize further downstream processes such as removal of volatiles in further reactors by aeration or similar processes.

In a further advantageous aspect, the process according to the present invention allows for good productivity in spite of low hydrogen concentration. The process according to the present invention together with the catalyst system further allows moderately broadening of the molecular weight distribution compared to a single reactor process. On top of that the inventive process shows excellent comonomer response, particularly hexene response, such that comonomer recovery, particularly hexene recovery, is not necessarily required even on an industrial scale.

The melting temperature Tm of the inventive composition is 135° C. to 140° C. (DSC according to ISO 11357/part 3) and preferably 136° C. to 139°.

The $MFR_2$ of the inventive polypropylene composition is 0.05 to 0.50 g/10 min, preferably is 0.16 to 0.33 g/10 min (2.16 kg, 230° C., ISO1133), more preferably is 0.21 to 0.32 g/10 min, even more preferably is 0.22 to 0.32 g/10 min, and most preferably 0.23 to 0.31 g/10 min.

The content of units derived from 1-hexene of the inventive polypropylene composition is at least 1.80 wt.-% to 5.0 wt.-%, preferably 2.10 to 3.5 wt.-%, more preferably 2.20 to 3.0 wt.-% and most preferably 2.30 to 2.9 wt.-%.

The content of xylene solubles according to ISO16152 of the inventive polypropylene composition is 0.2 to 2.5 wt.-%, 0.3 to 1.5 wt.-%, more preferably 0.3 to 1.0 wt.-% and most preferably 0.4 to 0.8 wt.-%. When ethylene is present as a further comonomer, the xylene solubles according to ISO16152 of the inventive polypropylene composition will be slightly higher. In such embodiment, the xylene solubles will be preferably between 1.5 and 2.5 wt.-%.

The molecular weight distribution Mw/Mn of the inventive polypropylene composition is at least 2.8 and less than 6.0 (Mn being the number average molecular weight and Mw being the weight average molecular weight both being determined by Gel Permeation Chromatography (GPC) according to ISO 16014-4:2003 and ASTM D 6474-99), preferably at least 3.0, even more preferably at least 3.5 and most preferably at least 4.0. The molecular weight distribution Mw/Mn of the inventive polypropylene composition preferably will not exceed 5.5.

The polypropylene composition according to the present invention preferably has a flexural modulus of at least 800 MPa, more preferably at least 900 MPa and most preferably at least 950 MPa when measured according to ISO 178 using test specimens having a dimension of 80×10×4.0 $mm^3$ (length×width×thickness) and being prepared by injection molding according to EN ISO 1873-2. When the polypropylene composition according to the present invention does not include units derived from ethylene, the flexural modulus will usually be at least 900 MPa and preferably at least 950 MPa. When the polypropylene composition according to the present invention includes ethylene in minor amounts of up to 1.0 wt.-% with respect to the polypropylene composition the flexural modulus will be moderately lower, i.e. higher than 800 MPa. Usually the flexural modulus of the polypropylene composition according to the present invention will not be higher than 1500 MPa. If ethylene is present in minor amount of up to 1.0 wt.-% with respect to the polypropylene composition the flexural modulus usually will not be higher than 1200 MPa.

The catalyst system as used in the present invention includes a catalyst component according to formula (I)

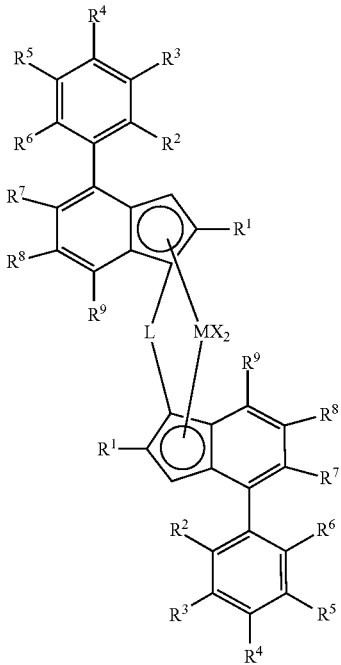

wherein
M is zirconium or hafnium;
each X independently is a sigma-donor ligand
L is a bridge of formula -(ER)$_y$—;
y is 1 or 2;
E is C or Si;
each R$^{10}$ is independently a C$_1$-C$_{20}$-hydrocarbyl group, tri(C$_1$-C$_{20}$ alkyl)silyl group, C$_6$-C$_{20}$ aryl group, C$_7$-C$_{20}$ arylalkyl group or C$_7$-C$_{20}$ alkylaryl group or L is an alkylene group such as methylene or ethylene;
R$^1$ are each independently the same or are different from each other and are a CH$_2$—R$^{11}$ group, with R$^{11}$ being H or linear or branched C$_1$-C$_6$ alkyl group, C$_3$-C$_8$ cycloalkyl group, C$_6$-C$_{10}$ aryl group;
R$^3$, R$^4$ and R$^5$ are each independently the same or different from each other and are H or a linear or branched C$_1$-C$_6$ alkyl group, C$_7$-C$_{20}$ arylalkyl group, C$_7$-C$_{20}$ alkylaryl group, or C$_6$-C$_{20}$ aryl group with the proviso that if there are four or more R$^3$, R$^4$ and R$^5$ groups different from H present in total, one or more of R$^3$, R$^4$ and R$^5$ is other than tert butyl;
R$^7$ and R$^8$ are each independently the same or different from each other and are H, a CH$_2$—R$^{12}$ group, with R$^{12}$ being H or linear or branched C$_1$-C$_6$ alkyl group, SiR$^{13}$$_3$, GeR$^{13}$$_3$, OR$^{13}$, SR$^{13}$, NR$^{13}$$_2$,
wherein
R$^{13}$ is a linear or branched C$_1$-C$_6$ alkyl group, C$_7$-C$_{20}$ alkylaryl group and C$_7$-C$_{20}$ arylalkyl group or C$_6$-C$_{20}$ aryl group.
The catalyst system may include also
(ii) a cocatalyst system comprising a boron containing cocatalyst and an aluminoxane cocatalyst;
It should be stressed that, in some instances the use of such cocatalyst may not be required.
The catalyst system of the invention can be used in non-supported form or in solid form. The catalyst system of the invention may be used as a homogeneous catalyst system or heterogeneous catalyst system.

The catalyst system of the invention in solid form, preferably in solid particulate form can be either supported on an external carrier material, like silica or alumina, or, in a particularly preferred embodiment, is free from an external carrier, however still being in solid form. For example, the solid catalyst system is obtainable by a process in which
(a) a liquid/liquid emulsion system is formed, said liquid/liquid emulsion system comprising a solution of the catalyst components (i) and (ii) dispersed in a solvent so as to form dispersed droplets; and
(b) solid particles are formed by solidifying said dispersed droplets.
Particular complexes of the invention include:
Rac-anti-dimethylsilanediyl[2-methyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-iso-butyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-neo-pentyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-benzyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Rac-anti-dimethylsilanediyl[2-cyclohexylmethyl-4-(4-tert-butylphenyl)-5,6,7-trihydro-s-indacen-1-yl][2-methyl-4-(4-tert-butylphenyl)-5-methoxy-6-tert-butylindenyl zirconium dichloride or dimethyl,
Race-anti-dimethylsilanediyl[2-methyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Rac-anti-dimethylsilanediyl[2-iso-butyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Rac-anti-dimethylsilanediyl[2-neo-pentyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl,
Rac-anti-dimethylsilanediyl[2-benzyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl, and
Rac-anti-dimethylsilanediyl[2-cyclohexylmethyl-4-(3,5-dimethylphenyl)-5,6,7-trihydro-s-indacen-1-yl][2-methyl-4-(3,5-dimethylphenyl)-5-methoxy-6-tert-butylindenyl zirconium dichloride or dimethyl.
The catalysts have been described inter alia in WO2015/011135 which is incorporated by reference herewith. A particularly preferred catalyst is catalyst number 3 of WO2015/011135. The preparation of the metallocenes has been described in WO2013/007650 which is incorporated by reference herewith. The complex preparation of the particular preferred catalyst has been described as E2 in WO2013/007650.
For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

The ligands required to form the complexes and hence catalysts/catalyst system of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780 and WO2015/158790. The examples section also provides the skilled person with sufficient direction.

As stated above a cocatalyst is not always required. However, when used, the cocatalyst system comprises a boron containing cocatalyst as well as an aluminoxane cocatalyst.

The aluminoxane cocatalyst can be one of formula (X):

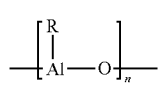
(X)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_3$-$C_{10}$-cycloalkyl, $C_7$-$C_{12}$-arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention the aluminoxane cocatalyst is used in combination with a boron containing cocatalyst, i.e. when a cocatalyst system or a cocatalyst is present, which is usually not required.

Boron based cocatalysts of interest include those of formula (Z)

$$BY_3 \quad (Z)$$

wherein Y independently is the same or can be different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl)phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl) borane and/or tris (3,4,5-trifluorophenyl)borane.

Particular preference is given to tris(pentafluorophenyl) borane.

Borates can be used, i.e. compounds containing a borate 3+ ion. Such ionic cocatalysts preferably contain a non-coordinating anion such as tetrakis(pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include: triethylammoniumtetra (phenyl)borate, tributylammoniumtetra(phenyl)borate, trimethylammoniumtetra(tolyl)borate, tributylammoniumtetra (tolyl)borate, tributylammoniumtetra(pentafluorophenyl) borate, tripropylammoniumtetra(dimethylphenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl) borate, N,N-dimethylaniliniumtetra(phenyl)borate, N,N-diethylaniliniumtetra(phenyl)borate, N,N-dimethylaniliniumtetrakis(pentafluorophenyl)borate, N,N-di(propyl) ammoniumtetrakis(pentafluorophenyl)borate, di(cyclohexyl)ammoniumtetrakist(pentafluorophenyl)borate, triphenylphosphoniumtetrakis(phenyl)borate, triethylphosphoniumtetrakis(phenyl)borate, diphenylphosphoniumtetrakis(phenyl)borate, tri(methylphenyl) phosphoniumtetrakis(phenyl)borate, tri(dimethylphenyl) phosphoniumtetrakis(phenyl)borate, triphenylcarbeniumtetrakis(pentafluorophenyl)borate, or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

The catalyst of the invention can be used in supported or unsupported form. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst. Especially preferably the support is a porous material so that the complex may be loaded into the pores of the support, e.g. using a process analogous to those described in WO94/14856 (Mobil), WO95/12622 (Borealis) and WO2006/097497.

The particle size is not critical but is preferably in the range 5 to 200 μm, more preferably 20 to 80 μm. The use of these supports is routine in the art.

In an alternative embodiment, no support is used at all. Such a catalyst system can be prepared in solution, for example in an aromatic solvent like toluene, by contacting the metallocene (as a solid or as a solution) with the cocatalyst, for example methylaluminoxane previously dissolved in an aromatic solvent, or can be prepared by sequentially adding the dissolved catalyst components to the polymerization medium.

In one particularly preferred embodiment, no external carrier is used but the catalyst is still presented in solid particulate form. Thus, no external support material, such as inert organic or inorganic carrier, for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalyst is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e. g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934. Preferably solidification is caused by an external stimulus to the emulsion system such as a temperature change to cause the solidification. Thus in said step the catalyst component (s) remain "fixed" within the formed solid particles.

It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with a uniform particle size distribution can be obtained.

The process is also industrially advantageous, since it enables the preparation of the solid particles to be carried out as a one-pot procedure. Continuous or semicontinuous processes are also possible for producing the catalyst.

In the polymerization process according to the present invention fresh catalyst is preferably only introduced into the first reactor or, if present, into the prepolymerization reactor or vessel, i.e. no fresh catalyst is introduced into the second reactor or any further reactor being present upstream of the first reactor or upstream of the prepolymerization vessel. Fresh catalyst denotes the virgin catalyst species or the virgin catalyst species subjected to a prepolymerization.

In a further aspect, the first intermediate (PP1) as obtained from the first reactor preferably has a melting temperature Tm in the range of 145 to 157° C. (DSC according to ISO 11357/part 3, stabilized),
and(or
a $MFR_2$ (ISO1133, 2.16 kg) of 0.30 to 0.80 g/10 min,
and/or
units derived from 1-hexene in an amount of at least 1.0 wt.-%,
and/or
units derived from 1-hexene in an amount of less than 2.5 wt.-%,
and/or
a XS measured according to ISO16152 of less than 2.0 wt.-%,
and/or
a XS measured according to ISO16152 of more than 0.5 wt.-%.

It is particularly preferred the first intermediate (PP1) as obtained from the first reactor has a melting temperature Tm in the range of 145 to 156° C. (DSC according to ISO 11357/part 3, stabilized),
and
a MFR2 (ISO1133, 2.16 kg) of 0.30 to 0.60 g/10 min,
and
units derived from 1-hexene in an amount of at least 1.1 wt.-%,
and
units derived from 1-hexene in an amount of less than 2.0 wt.-%, and
a XS measured according to ISO16152 of less than 1.5 wt.-%,
and
a XS measured according to ISO16152 of more than 0.5 wt.-%.

The amount of the first intermediate (PP1) in the final polypropylene composition is preferably from 41 to 49% by weight, more preferably from 41 to 45% by weight. More preferably the amount of the first intermediate (PP1) in the raw polypropylene composition (PP2) is preferably from 41 to 49% by weight, more preferably from 41 to 45% by weight.

The first reactor preferably is a loop reactor and/or the second reactor is a gas phase reactor.

Usually in the process according to the present invention a prepolymerization precedes the first polymerization stage taking place in the first reactor or in a prepolymerization vessel.

In the process according to the present invention, the polymerization is preferably carried out without an external donor.

The raw polypropylene composition (PP2) as obtained from the second reactor preferably has fines less than 0.04 wt.-% and/or preferably total volatiles less than 90 ppm (VDA277), more preferably less than 80 ppm. Particles having a Dv50 of smaller than 0.105 mm when measured according to ISO 13320-1 are denoted fines. These aspects render the process according to the present invention particularly advantageous compared to traditional sequential processes. As described above, the activity of the catalyst in the reactor setup as described herein is even sufficiently high such that comonomer recovery may not be necessary.

DETAILED DESCRIPTION

In the following particularly preferred embodiments of the present invention are described.

In a first preferred embodiment the polypropylene composition according to the present invention has
a melting temperature Tm of 136° C. to 140° C. (DSC according to ISO 11357/part 3),
an MFR2 of 0.20 to 0.40 g/10 min (2.16 kg, 230° C., ISO1133),
a XS according to ISO16152 of 0.2 wt.-% to less than 1.0 wt.-%, and
a molecular weight distribution Mw/Mn of at least 3.5 and less than 6.0, wherein Mn is the number average molecular weight and Mw is the weight average molecular weight both being determined by Gel Permeation Chromatography (GPC) according to ISO 16014-4:2003 and ASTM D 6474-99, whereby the polyproylene composition comprises units derived from 1-hexene in an amount of 2.30 wt.-% to 3.5 wt.-%.

In this preferred embodiment, the polymeric part of the polypropylene composition preferably includes only units derived from propylene and 1-hexene.

In a second embodiment the polypropylene composition according to the present invention has
a melting temperature Tm of 137° C. to 140° C. (DSC according to ISO 11357/part 3),
an MFR2 of 0.20 to 0.40 g/10 min (2.16 kg, 230° C., ISO1133),
a XS according to ISO16152 of 1.5 wt.-% to 2.5 wt.-%, and
a molecular weight distribution Mw/Mn of at least 3.5 and less than 6.0, wherein Mn is the number average molecular weight and Mw is the weight average molecular weight both being determined by Gel Permeation Chromatography (GPC) according to ISO 16014-4:2003 and ASTM D 6474-99, whereby the polyproylene composition comprises units derived from 1-hexene in an amount of 2.30 wt.-% to 3.5 wt.-% and units derived from ethylene in an amount of less than 1.0 wt.-%.

In a third preferred embodiment the polypropylene composition according to the present invention has
a melting temperature Tm of 136° C. to 140° C. (DSC according to ISO 11357/part 3),
an MFR2 of 0.20 to 0.40 g/10 min (2.16 kg, 230° C., ISO1133),
a XS according to ISO16152 of 0.2 to 1.0 wt.-%, and
a molecular weight distribution Mw/Mn of at least 3.5 and less than 6.0, wherein Mn is the number average molecular weight and Mw is the weight average molecular weight both being determined by Gel Permeation Chromatography (GPC) according to ISO 16014-4:2003 and ASTM D 6474-99, whereby the polyproylene composition comprises
units derived from 1-hexene in an amount of 2.30 wt.-% to 3.5 wt.-%. and is obtainable by
(a) introducing a stream of propylene and 1-hexene to a first reactor, so that the ratio of the feed rate of 1-hexene to the feed rate of propylene is from 2.0 to 4.0 mol/kmol; further introducing a stream of catalyst system to the first reactor, whereby the catalyst has the following structure

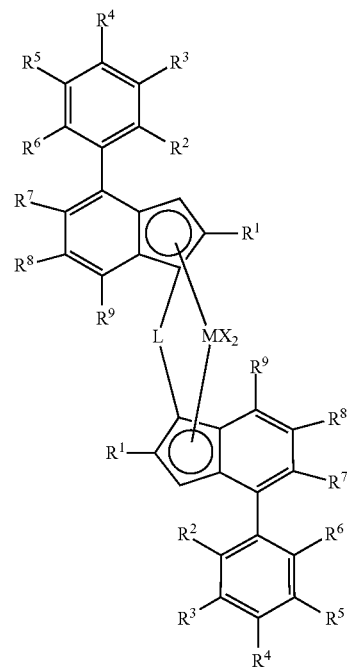

wherein
M is zirconium or hafnium;
each X independently is a sigma-donor ligand
L is a bridge of formula -$(ER^{10}_2)_y$—;
y is 1 or 2;
E is C or Si;

each $R^{10}$ is independently a $C_1$-$C_{20}$-hydrocarbyl group, tri($C_1$-$C_{20}$ alkyl)silyl group, $C_6$-$C_{20}$ aryl group, $C_7$-$C_{20}$ arylalkyl group or $C_7$-$C_{20}$ alkylaryl group or L is an alkylene group such as methylene or ethylene;

$R^1$ are each independently the same or are different from each other and are a $CH_2$—$R^{11}$ group, with $R^{11}$ being H or linear or branched $C_1$-$C_6$ alkyl group, $C_3$-$C_8$ cycloalkyl group, $C_6$-$C_{10}$ aryl group;

$R^3$, $R^4$ and $R^5$ are each independently the same or different from each other and are H or a linear or branched $C_1$-$C_6$ alkyl group, $C_7$-$C_{20}$ arylalkyl group, $C_7$-$C_{20}$ alkylaryl group, or $C_6$-$C_{20}$ aryl group with the proviso that if there are four or more $R^3$, $R^4$ and $R^5$ groups different from H present in total, one or more of $R^3$, $R^4$ and $R^5$ is other than tert butyl;

$R^7$ and $R^8$ are each independently the same or different from each other and are H, a $CH_2$—$R^{12}$ group, with $R^{12}$ being H or linear or branched $C_1$-$C_6$ alkyl group, $SiR^{13}_3$, $GeR^{13}_3$, $OR^{13}$, $SR^{13}$, $NR^{13}_2$, wherein $R^{13}$ is a linear or branched $C_1$-$C_6$ alkyl group, $C_7$-$C_{20}$ alkylaryl group and $C_7$-$C_{20}$ arylalkyl group or $C_6$-$C_{20}$ aryl group, $R^9$ are each independently the same or different from each other and are H or a linear or branched $C_1$-$C_6$ alkyl group; and $R^2$ and $R^6$ all are H;

polymerizing propylene and 1-hexene in the presence of the catalyst system in the first reactor to produce a first intermediate (PP1);

b) withdrawing a product stream comprising the first intermediate from the first reactor transferring the first intermediate (PP1) to a second reactor and c) further polymerizing in the second reactor the first intermediate (PP1) by feeding further propylene, 1-hexene in the presence of hydrogen such that the ratio of the concentration of hydrogen to the concentration of propylene is in the range of 0.1 to 0.8 mol/kmol; and further the concentration of 1-hexene to the concentration of propylene is in the range of 3.0 to 6.0 mol/kmol whereby yielding a raw polypropylene composition (PP2)

d) and extruding said raw polypropylene composition (PP2) into the polypropylene composition.

This guarantees excellent comonomer distribution.

In a fourth embodiment the polypropylene composition according to the present invention has a melting temperature Tm of 137° C. to 140° C. (DSC according to ISO 11357/part 3), an MFR2 of 0.20 to 0.40 g/10 min (2.16 kg, 230° C., ISO1133), a XS according to ISO16152 of 1.5 wt.-% to 2.5 wt.-%, and a molecular weight distribution Mw/Mn of at least 3.5 and less than 6.0, wherein Mn is the number average molecular weight and Mw is the weight average molecular weight both being determined by Gel Permeation Chromatography (GPC) according to ISO 16014-4:2003 and ASTM D 6474-99, whereby the polyproyplene composition comprises units derived from 1-hexene in an amount of 2.30 wt.-% to 3.5 wt.-% and units derived from ethylene in an amount of 0.1 to 1.0 wt.-%.

and is obtainable by (a) introducing a stream of propylene and 1-hexene to a first reactor, so that the ratio of the feed rate of 1-hexene to the feed rate of propylene is from 2.0 to 4.0 mol/kmol; further introducing a stream of catalyst system to the first reactor, whereby the catalyst has the following structure

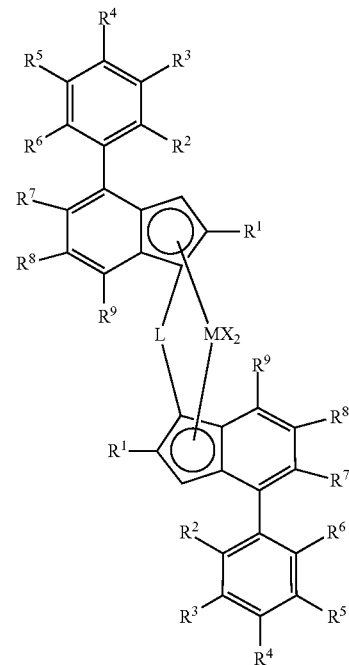

wherein

M is zirconium or hafnium;

each X independently is a sigma-donor ligand

L is a bridge of formula -($ER^{10}_2$)$_y$—;

y is 1 or 2;

E is C or Si;

each $R^{10}$ is independently a $C_1$-$C_{20}$-hydrocarbyl group, tri($C_1$-$C_{20}$ alkyl)silyl group, $C_6$-$C_{20}$ aryl group, $C_7$-$C_{20}$ arylalkyl group or $C_7$-$C_{20}$ alkylaryl group or L is an alkylene group such as methylene or ethylene;

$R^1$ are each independently the same or are different from each other and are a $CH_2$—$R^{11}$ group, with $R^{11}$ being H or linear or branched $C_1$-$C_6$ alkyl group, $C_3$-$C_8$ cycloalkyl group, $C_6$-$C_{10}$ aryl group;

$R^3$, $R^4$ and $R^5$ are each independently the same or different from each other and are H or a linear or branched $C_1$-$C_6$ alkyl group, $C_7$-$C_{20}$ arylalkyl group, $C_7$-$C_{20}$ alkylaryl group, or $C_6$-$C_{20}$ aryl group with the proviso that if there are four or more $R^3$, $R^4$ and $R^5$ groups different from H present in total, one or more of $R^3$, $R^4$ and $R^5$ is other than tert butyl;

$R^7$ and $R^8$ are each independently the same or different from each other and are H, a $CH_2$—$R^{12}$ group, with $R^{12}$ being H or linear or branched $C_1$-$C_6$ alkyl group, $SiR^{13}_3$, $GeR^{13}_3$, $OR^{13}$, $SR^{13}$, $NR^{13}_2$, wherein $R^{13}$ is a linear or branched $C_1$-$C_6$ alkyl group, $C_7$-$C_{20}$ alkylaryl group and $C_7$-$C_{20}$ arylalkyl group or $C_6$-$C_{20}$ aryl group, R⁹ are each independently the same or different from each other and are H or a linear or branched $C_1$-$C_6$ alkyl group; and $R^2$ and $R^6$ all are H;

polymerizing propylene and 1-hexene in the presence of the catalyst system in the first reactor to produce a first intermediate (PP1);

b) withdrawing a product stream comprising the first intermediate (PP1) from the first reactor;

c) transferring the first intermediate (PP1) to a second reactor and further polymerizing in the second reactor the first intermediate (PP1) by feeding further propylene, 1-hexene and ethylene in the presence of hydrogen such that the ratio of the concentration of hydrogen to the concentration of propylene is in the range of 0.1 to 0.8 mol/kmol; and further the concentration of 1-hexene to the concentration of propylene is in the range of 3.0 to 6.0 mol/kmol whereby yielding a raw polypropylene composition (PP2)

d) and further extruding said raw polypropylene composition (PP2) into the polypropylene composition.

As regards the process in general the propylene composition is produced in a sequential polymerization process comprising at least two polymerization zones operating at different conditions to produce the propylene composition. The polymerization zones may operate in slurry, solution, or gas phase conditions or their combinations. Suitable processes are disclosed, among others, in WO-A-98/58976, EP-A-887380 and WO-A-98/58977.

The catalyst may be transferred into the polymerization zone by any means known in the art. It is thus possible to suspend the catalyst in a diluent and maintain it as homogeneous slurry. Especially preferred it is to use oil having a viscosity from 20 to 1500 mPa·s as diluent, as disclosed in WO-A-2006/063771. It is also possible to mix the catalyst with a viscous mixture of grease and oil and feed the resultant paste into the polymerization zone. Further still, it is possible to let the catalyst settle and introduce portions of thus obtained catalyst mud into the polymerization zone in a manner disclosed, for instance, in EP-A-428054.

The polymerization in gas phase may be conducted in a fluidized bed reactor, in a fast fluidized bed reactor or in a settled bed reactor or in any combination of these. When a combination of reactors is used then the polymer is transferred from one polymerization reactor to another. Furthermore, a part or whole of the polymer from a polymerization stage may be returned into a prior polymerization stage.

In a preferred embodiment, the prepolymerization is conducted in a continuous manner as bulk slurry polymerization in liquid propylene, i.e. the liquid phase mainly comprises propylene, with minor amount of other reactants and optionally inert components dissolved therein. Preferably the prepolymerization is conducted in a continuous stirred tank reactor or a loop reactor.

The prepolymerization reaction is typically conducted at a temperature of 0 to 40° C., preferably from 10 to 30° C., and more preferably from 15 to 25° C.

The pressure in the prepolymerization reactor is not critical but must be sufficiently high to maintain the reaction mixture in liquid phase. Thus, the pressure may be from 20 to 100 bar, for example 30 to 70 bar.

The reaction conditions are well known in the art as disclosed, among others, in GB 1580635.

In the prepolymerization step it is also possible to feed comonomers into the prepolymerization stage.

In average, the amount of prepolymer on the catalyst is preferably from 10 to 1000 g per g of the solid catalyst component, more preferably is from 50 to 500 g per g of the solid catalyst component.

As the person skilled in the art knows, the catalyst particles recovered from a continuous stirred prepolymerization reactor do not all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst is preferably within the limits specified above. The amount of prepolymer is known in the art, among others, from GB 1580635.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or the walls of the reactor as disclosed in WO-A-00/66640.

The polymerization in the first polymerization zone may be conducted in slurry. Then the polymer particles formed in the polymerization, together with the catalyst fragmented and dispersed within the particles, are suspended in the fluid hydrocarbon. The slurry is agitated to enable the transfer of reactants from the fluid into the particles.

Slurry polymerization is preferably a so called bulk polymerization. By "bulk polymerization" is meant a process where the polymerization is conducted in a liquid monomer essentially in the absence of an inert diluent. However, as it is known to a person skilled in the art the monomers used in commercial production are never pure but always contain aliphatic hydrocarbons as impurities. For instance, the propylene monomer may contain up to 5% of propane as an impurity. As propylene is consumed in the reaction and also recycled from the reaction effluent back to the polymerization, the inert components tend to accumulate, and thus the reaction medium may comprise up to 40 wt-% of other compounds than monomer. It is to be understood, however, that such a polymerization process is still within the meaning of "bulk polymerization", as defined above.

The temperature in the slurry polymerization is typically from 50 to 110° C., preferably from 60 to 100° C. and in particular from 65 to 95° C. The pressure is from 1 to 150 bar, preferably from 10 to 100 bar. In some cases it may be preferred to conduct the polymerization at a temperature which is higher than the critical temperature of the fluid mixture constituting the reaction phase and at a pressure which is higher than the critical pressure of said fluid mixture. Such reaction conditions are often referred to as "supercritical conditions". The phrase "supercritical fluid" is used to denote a fluid or fluid mixture at a temperature and pressure exceeding the critical temperature and pressure of said fluid or fluid mixture.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

The slurry may be withdrawn from the reactor either continuously or intermittently. A preferred way of intermittent withdrawal is the use of settling legs where the solids concentration of the slurry is allowed to increase before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

Into the slurry polymerization stage other components may also be introduced as it is known in the art.

Process additives may also be introduced into the reactor to facilitate a stable operation of the process.

When the slurry polymerization stage is followed by a gas phase polymerization stage it is preferred to conduct the slurry directly into the gas phase polymerization zone without a flash step between the stages. This kind of direct feed is described in EP-A-887379, EP-A-887380, EP-A-887381 and EP-A-991684.

Typically the polymer is extruded and pelletized. The extrusion may be conducted in the manner generally known in the art, preferably in a twin screw extruder. One example of suitable twin screw extruders is a co-rotating twin screw extruder. Those are manufactured, among others, by Coperion or Japan Steel Works. Another example is a counter-rotating twin screw extruder. Such extruders are manufactured, among others, by Kobe Steel and Japan Steel Works.

The extruders typically include a melting section where the polymer is melted and a mixing section where the polymer melt is homogenised. Melting and homogenisation are achieved by introducing energy into the polymer. The more energy is introduced into the polymer the better homogenisation effect is achieved. However, too high energy incorporation causes the polymer to degrade and the mechanical properties to deteriorate. Suitable level of specific energy input (SEI) is from about 200 to about 450 kWh/ton polymer, preferably from 240 to 350 kWh/ton.

Typical average residence time of the polymer in the extruder is from about 30 seconds to about 10 minutes. This figure depends to some extent on the type of the extruder. However, for most extruder types values from 1 minute to 5 minutes result in a good combination between homogeneity and mechanical properties of the polymer.

Suitable extrusion methods have been disclosed, among others, in EP-A-1600276 and WO-A-98/15591.

Before the extrusion the desired additives are mixed with the polymer. Examples of such additives are, among others, antioxidants, process stabilizers, UV-stabilizers, pigments, fillers, antistatic additives, antiblock agents, nucleating agents and acid scavengers.

Suitable antioxidants and stabilizers are, for instance, 2,6-di-tert-butyl-p-cresol, tetrakis-[methylene-3-(3',5-di-tert-butyl-4'hydroxyphenyl)propionate]methane, octadecyl-3-3(3'5'-di-tert-butyl-4'-hydroxyphenyl)propionate, dilaurylthiodipropionate, distearylthiodipropionate, tris-(nonylphenyl)phosphate, distearyl-pentaerythritol-diphosphite and tetrakis(2,4-di-tert-butylphenyl)-4,4'-biphenylene-diphosphonite.

Some hindered phenols are sold under the trade names of Irganox 1076 and Irganox 1010. Commercially available blends of antioxidants and process stabilizers are also available, such as Irganox B225 marketed by Ciba-Geigy.

Suitable acid scavengers are, for instance, metal stearates, such as calcium stearate and zinc stearate. They are used in amounts generally known in the art, typically from 500 ppm to 10000 ppm and preferably from 500 to 5000 ppm.

EXPERIMENTAL

Measurement Methods

Al and Zr Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours. The analysis was run at room temperature using a Thermo Elemental iCAP 6300 Inductively Coupled Plasma-Optical Emmission Spectrometer (ICP-OES) which was calibrated using a blank (a solution of 5% $HNO_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% HNO3, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% HNO3, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

In the case of analysing the elemental composition of prepolymerized catalysts, the polymeric portion is digested by ashing in such a way that the elements can be freely dissolved by the acids. The total content is calculated to correspond to the weight % for the prepolymerized catalyst.

GPC: Molecular weight averages, molecular weight distribution, and polydispersity index ($M_n$, $M_w$, $M_w/M_n$)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99.

A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument Quantification of Copolymer Microstructure by NMR Spectroscopy Comonomer Content (Ethylene)

Quantitative $^{13}C\{^{1}H\}$ NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-d2 (TCE-d2) along with chromium-(III)-acetylacetonate (Cr(acac)$_3$) resulting in a 65 mM solution of relaxation agent in solvent as described in G. Singh, A. Kothari, V. Gupta, Polymer Testing 2009, 28(5), 475.

To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6 k) transients were acquired per spectra. Quantitative $^{13}C\{^{1}H\}$NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C\{^{1}H\}$ spectra. This method was chosen for its robust nature and ability to account for the presence of regio-defects when needed. Integral regions were slightly adjusted to increase applicability across the whole range of encountered comonomer contents.

Comonomer Content (1-Hexene)

Quantitative $^{13}C\{^{1}H\}$ NMR spectra recorded in the molten-state using a Bruker Avance III 500 NMR spectrometer operating at 500.13 and 125.76 MHz for $^{1}H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the NOE at short recycle delays of 3 s (Klimke, K., Parkinson, M., Piel, C., Kaminsky, W., Spiess, H. W., Wilhelm, M., Macromol. Chem. Phys. 2006; 207: 382., Pollard, M., Klimke, K., Graf, R., Spiess, H. W., Wilhelm, M., Sperber, O., Piel, C., Kaminsky, W., Macromolecules 2004; 37:813.). and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, S1, S198). A total of 16384 (16 k) transients were acquired per spectra.

Quantitative $^{13}C\{^{1}H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H=I\alpha B4/2$$

The amount of 1-hexene incorporated in PHHP double consecutive sequences was quantified using the integral of the ααB4 site at 41.7 ppm accounting for the number of reporting sites per comonomer:

$$HH=2*I\alpha\alpha B4$$

When double consecutive incorporation was observed the amount of 1-hexene incorporated in PHP isolated sequences needed to be compensated due to the overlap of the signals αB4 and αB4B4 at 44.4 ppm:

$$H=(I\alpha B4-2*I\alpha\alpha B4)/2$$

The total 1-hexene content was calculated based on the sum of isolated and consecutively incorporated 1-hexene:

$$H\text{total}=H+HH$$

When no sites indicative of consecutive incorporation observed the total 1-hexen comonomer content was calculated solely on this quantity:

$$H\text{total}=H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the ααα21e9 methylene site at 42.4 ppm:

$$P21 = I\alpha\alpha21e9$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12 = I_S\alpha\alpha + 2*P21 + H + HH/2$$

The total amount of propene was quantified as the sum of primary (1,2) and secondary (2,1-erythro) inserted propene:

$$P\text{total} = P12 + P21 = I_S\alpha\alpha + 3*I\alpha\alpha21e9 + (I\alpha B4 - 2*I\alpha\alpha B4)/2 + I\alpha\alpha B4$$

This simplifies to:

$$P\text{total} = I_S\alpha\alpha + 3*I\alpha\alpha21e9 + 0.5*I\alpha B4$$

The total mole fraction of 1-hexene in the polymer was then calculated as:

$$fH = H\text{total}/(H\text{total} + P\text{total})$$

The full integral equation for the mole fraction of 1-hexene in the polymer was:

$$fH = (((I\alpha B4 - 2*I\alpha\alpha B4)/2) + (2*I\alpha\alpha B4))/((I_S\alpha\alpha + 3*I\alpha\alpha21e9 + 0.5*I\alpha B4) + ((I\alpha B4 - 2*I\alpha\alpha B4)/2) + (2*I\alpha\alpha B4))$$

This simplifies to:

$$fH = (I\alpha B4/2 + I\alpha\alpha B4)/(I_S\alpha\alpha + 3*I\alpha\alpha21e9 + I\alpha B4 + I\alpha\alpha B4)$$

The total comonomer incorporation of 1-hexene in mole percent was calculated from the mole fraction in the usual manner:

$$H[\text{mol \%}] = 100*fH$$

The total comonomer incorporation of 1-hexene in weight percent was calculated from the mole fraction in the standard manner:

$$H[\text{wt \%}] = 100*(fH*84.16)/((fH*84.16) + ((1-fH)*42.08))$$

Density

Density is measured according to ISO 1183-187. Sample preparation is done by compression moulding in accordance with ISO 1872-2:2007.

DSC analysis, melting temperature (Tm) and crystallization temperature (Tc): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C.

Crystallization temperature and heat of crystallization (Hc) are determined from the cooling step, while melting temperature and heat of fusion (Hf) are determined from the second heating step.

Xylene Cold Soluble (XCS) Content

The xylene soluble (XS) fraction as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XS\% = (100 \cdot m \cdot Vo)/(mo \cdot v); \quad mo = \text{initial polymer amount (g); } m = \text{weight of residue (g); } Vo = \text{initial volume (ml); } v = \text{volume of analysed sample (ml).}$$

Melt Flow Rate (MFR)

The melt flow rate (MFR) or melt index (MI) is measured according to ISO 1133. Where different loads can be used, the load is normally indicated as the subscript, for instance, $MFR_2$ which indicates 2.16 kg load. The temperature is selected according to ISO 1133 for the specific polymer, for instance, 230° C. for polypropylene. Thus, for polypropylene $MFR_2$ is measured at 230° C. temperature and under 2.16 kg load.

Flexural Modulus

The flexural modulus is determined according to ISO 178. The test specimens have a dimension of 80×10×4.0 mm$^3$ (length×width×thickness) and are prepared by injection molding according to EN ISO 1873-2. The length of the span between the supports: 64 mm. The test speed: 2 mm/min. Force: 100 N.

Notched Impact Strength (NIS)

The Charpy notched impact strength (NIS) was measured according to ISO 179 1eA at +23° C., using injection moulded bar test specimens of 80×10×4 mm$^3$ prepared in accordance with EN ISO 1873-2.

Pipe Pressure Test

The pressure test performance of pipes produced from two inventive compositions and one comparative composition was tested in accordance with ISO 1167-1 and -2. The pipes having a diameter of 32 mm and a wall thickness of 3 mm were produced in accordance with ISO 1167-2 on a conventional pipe extrusion line, then subjected to a circumferential (hoop) stress of 16 MPa at a temperature of 20° C. in a water-in-water setup in accordance with ISO 1167-1. The time in hours to failure was registered, times with an addition "still running" meaning that the failure time had not yet been reached at the time of filing of the present patent application.

Catalyst Activity

The catalyst activity was calculated on the basis of following formula:

Catalyst Activity $$(\text{kg}-PP/\text{g}-Cat/\text{h}) = \frac{\text{amount of polymer produced (kg)}}{\text{catalyst loading (g)} \times \text{polymerisation time (h)}}$$

Productivity

Overall productivity was calculated as $$\text{Catalyst Productivity } (\text{kg}-PP/\text{g}) = \frac{\text{amount of polymer produced (kg)}}{\text{catalyst loading (g)}}$$

For both the catalyst activity and the productivity the catalyst loading is either the grams of prepolymerized catalyst or the grams of metallocene present in that amount of prepolymerized catalyst.

Prepolymerization Degree (DP): Weight of Polymer/Weight of Solid Catalyst Before Prepolymerization Step The composition of the catalysts (before the off-line prepolymerization step) has been determined by ICP as described above. The metallocene content of the prepolymerized catalysts has been calculated from the ICP data as follows:

$$\frac{Al}{Zr}(\text{mol/mol}) = \frac{Al(\text{wt \%, }ICP)/26,98}{Zr(\text{wt \%, }ICP)/91,22} \quad \text{Equation 1}$$

$$Zr(\text{mol \%}) = \frac{100}{\frac{Al}{Zr}(\text{mol/mol}) + 1} \quad \text{Equation 2}$$

$$MC(\text{wt \%, }unprepol.\text{ cat}) = \frac{100 \times (Zr,\text{ mol \%} \times MwMC)}{Zr,\text{ mol \%} \times MwMC + (100 - Zr,\text{ mol \%}) \times MwMAO} \quad \text{Equation 3}$$

$$MC(\text{wt \%, prepolymerized cat}) = \frac{MC(\text{wt \%, unprepolymerized cat})}{DP + 1} \quad \text{Equation 4}$$

Particle Size

Particle size distribution was measured in accordance with ISO 13320-1 with a Coulter LS 200 particle size analyzer. The instrument is able to measure the particle size distribution in a range of 0.4-2000 μm. The method is a laser diffraction method, where a laser beam is directed at the sample travelling in a flow-through cuvette. n-Heptane was used as the sample fluid.

The polymer sample was first pre-treated by screening out particles larger than 2 mm. The screened sample was mixed with isopropanol and put in an ultra-sound device in order to separate the particles from each other. The pre-treated sample was then placed in the sample unit and analysed. The result was calculated using a computer program provided with the instrument.

The PSD index (also called SPAN) is defined by the following equation (3) below:

$$PSD \text{ Index} = \frac{d_{90} - d_{10}}{d_{50}} \quad (3)$$

wherein $d_{50}$ (DV50) represents the median volumetric particle diameter, $d_{90}$ (Dv90) represents the smallest particle diameter so that 90% of the particles have a smaller diameter than $d_{90}$; $d_{10}$ (Dv10) represents the smallest particle diameter so that 10% of the particles have a smaller diameter than $d_{10}$.

The following particle size and particle size distribution indicators have been used in the experiments:
Dv90=the volumetric amount of particle diameter at 90% cumulative size,
Dv10=the volumetric amount of particle diameter at 10% cumulative size,
Dv50=the volumetric amount of particle diameter at 50% cumulative size (median volumetric particle size),
SPAN=$(Dv90-Dv10)/Dv50$.

EXAMPLES

Examples were carried out in the pilot scale. A loop-gas phase reactor set up was used.

Polymerisation examples are shown in Table 1. Comparative examples were carried out with a Ziegler Natta catalyst, TEAL and donor D. First, 0.1 mol of MgCl2×3 EtOH was suspended under inert conditions in 250 ml of decane in a reactor at atmospheric pressure. The solution was cooled to the temperature of −15° C. and 300 ml of cold TiCl4 was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl4 was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390.

The catalyst used in the working examples was prepared as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol. The metallocene complex (MC1 in WO2015/011135 A1) was prepared as described in WO 2013/007650A1 (metallocene E2 in WO2013/007650 A1).

Hexene was used as comonomer in all cases and the hexene was fed to the both reactors, loop and gas phase reactor in order to control the desired hexene content for the final product.

In the working example 3 also ethylene was fed to the gas phase reactor.

| Example | Comparative Example 1 | Comparative Example 2 | Working Example 1 | Working Example 2 | Working Example 3 |
|---|---|---|---|---|---|
| Product type | PP-r (hexene) | PP-r (hexene) | PP-r (hexene) | PP-r (hexene) | PP-r (hexene) |
| Catalyst type | ZNPP | ZNPP | SSC | SSC | SSC |
| Catalyst | TEAL | TEAL | WO2015/011135, Catalyst 3 | WO2015/011135, Catalyst 3 | WO2015/011135, Catalyst 3 |
| Co-catalystsys |  |  | Borate/TEAL | Borate/TEAL | Borate/TEAL |
| Donor type | D | D | No Donor | No Donor | No Donor |
| Prepolymerisation reactor |  |  |  |  |  |
| Catalyst feed (g/h) | 1.72 | 1.69 | 3.72 | 3.85 | 3.55 |
| external Cocatalyst feed (g/t propylene) | 139 | 137 | 0 | 0 | 0 |

-continued

| Example | Comparative Example 1 | Comparative Example 2 | Working Example 1 | Working Example 2 | Working Example 3 |
|---|---|---|---|---|---|
| Donor feed (g/t propylene) | 28 | 27 | 0 | 0 | 0 |
| Al/Ti ratio (mol/mol) | 199 | 201 | — | — | — |
| Al/donor ratio (mol/mol) | 10 | 10 | — | — | — |
| B1 Temp. (° C.) | 25.1 | 25 | 20 | 20 | 20 |
| B1 Press. (kPa) | 5500 | 5500 | 4791 | 4765 | 4792 |
| B1 Residence time (h) | 0.21 | 0.21 | 0.2 | 0.22 | 0.2 |
| B1 Hydrogen feed (g/h) | 0.330 | 0.350 | 0.102 | 0.102 | 0.102 |
| Loop reactor | | | | | |
| Temperature (° C.) | 80 | 80 | 75 | 75 | 75 |
| Pressure (kPa) | 5361 | 5368 | 4552 | 4527 | 4553 |
| Propylene feed (kg/h) | 136.4 | 136.5 | 164.9 | 164.5 | 164.9 |
| Hexene feed (kg/h) | 4.00 | 4.10 | 1.10 | 1.10 | 1.09 |
| H2/C3 ratio (mol/kmol) | 0.060 | 0.070 | 0.020 | 0.020 | 0.020 |
| C6/C3 ratio (mol/kmol) | 14.6 | 15.1 | 3.3 | 3.3 | 3.3 |
| Residence time (h) | 0.6 | 0.61 | 0.5 | 0.5 | 0.5 |
| Production rate (kg/h) | 31 | 31.2 | 34.9 | 36.8 | 37.6 |
| Polymer Split (wt.-%) | 48 | 50 | 45 | 42 | 42 |
| Catalyst productivity (kg/g) | 18 | 18 | 9.9 | 10.1 | 11.1 |
| Tm (° C.) | 160.7 | 162.1 | 146.4 | 149.4 | 155.4 |
| MFR2 (g/10 min) | 0.040 | 0.06 | 0.39 | 0.58 | 0.51 |
| C6 content (%) | 0.3 | 0.4 | 1.3 | 1.2 | 1.2 |
| XS (%) | 1.8 | 1.7 | 1.1 | 1.2 | 1.3 |
| Average particle size | 0.95 | 0.85 | 1.2 | 1.2 | 1.2 |
| Bulk density (kg/m3) | 330 | 321 | 463 | 466 | 472 |
| GPR reactor | | | | | |
| Temperature (° C.) | 85 | 85 | 80 | 80 | 80 |
| Pressure (kPa) | 2023 | 2291 | 2400 | 2399 | 2400 |
| Propylene feed (kg/h) | 120 | 120 | 210 | 208 | 207 |
| Hydrogen feed (g/h) | 34 | 17 | 0.7 | 0.3 | 0.5 |
| H2/C3 ratio (mol/kmol) | 10.6 | 6.9 | 0.53 | 0.38 | 0.63 |
| C6/C3 concentration ratio (mol/kmol) | 14.2 | 14.1 | 4.3 | 5.2 | 4.3 |
| C2/C3 concentration ratio (mol/kmol) | | | | | 55.0 |
| Residence time (h) | 1.77 | 1.86 | 2.1 | 2.3 | 2.2 |
| Production rate (kg/h) | 34 | 30 | 43 | 39 | 43 |
| Polymer Split (wt.-%) | 52 | 50 | 55 | 58 | 58 |
| Total volatiles (PP2) | 600 | 550 | 75 | 72 | 80 |
| Total catalyst productivity (kg/g) | 37.8 | 36.3 | 20.8 | 19.7 | 22.6 |
| Bulk density (kg/m3) | 410 | 361 | 508 | 501 | 531 |

-continued

| Example | Comparative Example 1 | Comparative Example 2 | Working Example 1 | Working Example 2 | Working Example 3 |
|---|---|---|---|---|---|
| Average particle size (mm) (PP2) | 1.31 | 1.14 | 1.38 | 1.35 | 1.51 |
| Fines (wt.-%) (PP2) | 1.8 | 1.9 | 0.01 | 0.03 | 0.03 |
| Final | | | | | |
| Tm (° C.) | 154.5 | 156.2 | 139.6 | 137.9 | 139.4 |
| Tcr (° C.) | 117.9 | 116.5 | 103.0 | 102.4 | 97.9 |
| MFR$_2$ (g/10 min; 230° C.; 2.16 kg) | 0.29 | 0.31 | 0.31 | 0.29 | 0.32 |
| XS (%) | 1.3 | 1.3 | 0.79 | 0.58 | 1.98 |
| Mw/Mn (GPC) | 8.5 | — | 4.3 | 4.6 | 4.4 |
| Total C6 (wt.-%) | 1.40 | 1.30 | 2.30 | 2.50 | 2.80 |
| Total C2 (wt.-%) | | | | | 0.70 |
| Flexural modulus | 1460 | — | 1013 | 969 | 825 |
| NIS Charpy (23° C.) | 2.9 | | 7.2 | 7.6 | 6.2 |
| NIS Charpy (0° C.) | 1.5 | | 2.4 | 2.1 | 1.9 |
| NIS Charpy (−20° C.) | 1.0 | | 2.0 | 2.1 | 1.5 |
| Pipe | | | | | |
| Pipe impact test (0° C.) | | | 10 | nd | nd |
| Pipe pressure test 20° C., 16 MPa | 23 h | | 7748 h | nd | 38 h |
| Pipe pressure test 95° C., 4.5 MPa | 650 h | | >9900 h (still running) | nd | >9400 h (still running) |

The invention claimed is:

1. Article comprising a polypropylene composition, wherein the polypropylene composition has:
   a melting temperature Tm of 135° C. to 140° C. (DSC according to ISO 11357/part 3),
   an MFR$_2$ of 0.05 to 0.50 g/10 min (2.16 kg, 230° C., ISO1133),
   a xylene soluble content (XS) within the range of 1.0 to 2.5 wt. %, and
   a flexural modulus of 800 MPa to 900 MPa when measured according to ISO 178 using test specimens having a dimension of 80×10×4.0 mm$^3$ (length×width×thickness) and being prepared by injection molding according to EN ISO 1873-2, and whereby the polypropylene composition includes
   units derived from 1-hexene in an amount of 1.8 wt. % to 5.0 wt. % and units derived from ethylene.

2. Article according to claim 1, having:
   a pipe pressure test stability of at least 2000h (95° C., 4.5 MPa) following ISO 1167-1 and -2.

* * * * *